US009683664B2

(12) United States Patent
Nielsen et al.

(10) Patent No.: US 9,683,664 B2
(45) Date of Patent: Jun. 20, 2017

(54) DOUBLE SEAT VALVE

(71) Applicant: ALFA LAVAL CORPORATE AB, Lund (SE)

(72) Inventors: Jesper Bak Nielsen, Vejen (DK); Karl-Age Lindholm Jensen, Odense (DK)

(73) Assignee: ALFA LAVAL CORPORATE AG, Lund (SE)

( * ) Notice: Subject to any disclaimer, the term of this patent is extended or adjusted under 35 U.S.C. 154(b) by 0 days.

(21) Appl. No.: 14/786,322

(22) PCT Filed: May 28, 2014

(86) PCT No.: PCT/EP2014/061079
§ 371 (c)(1),
(2) Date: Oct. 22, 2015

(87) PCT Pub. No.: WO2014/202368
PCT Pub. Date: Dec. 24, 2014

(65) Prior Publication Data
US 2016/0076654 A1 Mar. 17, 2016

(30) Foreign Application Priority Data

Jun. 21, 2013 (EP) .................................. 13173317

(51) Int. Cl.
F16K 23/00 (2006.01)
F16K 1/44 (2006.01)

(52) U.S. Cl.
CPC .................................. F16K 1/446 (2013.01)

(58) Field of Classification Search
CPC . F16K 1/44; F16K 1/443; F16K 1/446; Y10T 137/88038
(Continued)

(56) References Cited

U.S. PATENT DOCUMENTS 6,014,983 A * 1/2000 Sondergaard ........... F16K 1/446
137/240
6,047,730 A 4/2000 Coura
(Continued)

FOREIGN PATENT DOCUMENTS

DE      42 03 724 A1    8/1993
DE   10 2005 057103 A1   5/2007
(Continued)

OTHER PUBLICATIONS

International Search Report (PCT/ISA/210) mailed on Jun. 25, 2014, by the European Patent Office as the International Searching Authority for International Application No. PCT/EP2014/061079.
(Continued)

Primary Examiner — Reinaldo Sanchez-Medina
(74) Attorney, Agent, or Firm — Buchanan Ingersoll & Rooney PC

(57) ABSTRACT

A double seat valve comprising a valve housing, a first closing element, a second closing element, a leakage chamber arranged intermediate the first and second closing elements, the second closing element connected to the second displacement rod via spokes, wherein at least one of the spokes comprises: a leading edge that faces the leakage chamber and extends in a radial direction outwards from the second displacement rod; and first and second sides that extend from the leading edge in a direction from the leakage chamber to the drain passage on a respective side of the spoke.

17 Claims, 6 Drawing Sheets

(58) Field of Classification Search
USPC .......... 137/240, 312, 614.17, 614.18, 614.19
See application file for complete search history.

(56) References Cited

U.S. PATENT DOCUMENTS

| | | | | |
|---|---|---|---|---|
| 6,230,736 | B1* | 5/2001 | Scheible | F16K 1/446 |
| | | | | 137/240 |
| 7,845,368 | B2* | 12/2010 | Burmester | F16K 1/446 |
| | | | | 137/240 |
| 7,891,376 | B2 | 2/2011 | Neuhauser et al. | |
| 8,051,856 | B2* | 11/2011 | Bare | A61M 16/0468 |
| | | | | 128/207.14 |
| 8,327,881 | B2 | 12/2012 | Norton | |
| 8,336,572 | B2 | 12/2012 | Burmester et al. | |
| 8,596,302 | B2* | 12/2013 | Fontenit | F16K 1/446 |
| | | | | 137/614.18 |
| 8,739,828 | B2 | 6/2014 | Neuhauser et al. | |
| 2007/0151611 | A1 | 7/2007 | Deger | |
| 2010/0051115 | A1 | 3/2010 | Jensen et al. | |
| 2010/0072411 | A1 | 3/2010 | Norton | |
| 2011/0114198 | A1 | 5/2011 | Burmester et al. | |
| 2011/0197985 | A1 | 8/2011 | Fontenit et al. | |

FOREIGN PATENT DOCUMENTS

| | | |
|---|---|---|
| EP | 2 333 385 A1 | 6/2011 |
| WO | WO 2012/034862 A1 | 3/2012 |

OTHER PUBLICATIONS

Written Opinion (PCT/ISA/237) mailed on Jun. 25, 2014, by the European Patent Office as the International Searching Authority for International Application No. PCT/EP2014/061079.

Search Report mailed on Nov. 14, 2013, by the European Patent Office for Application No. 13173317.2.

* cited by examiner

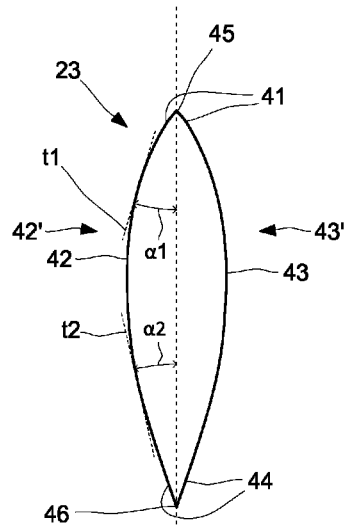 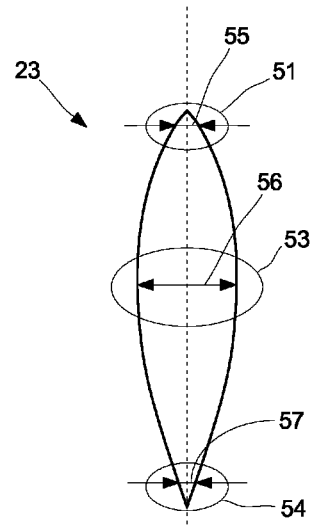
Fig. 10     Fig. 11
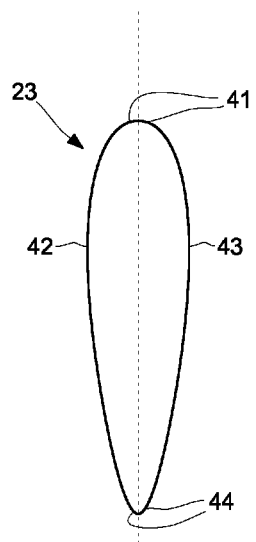 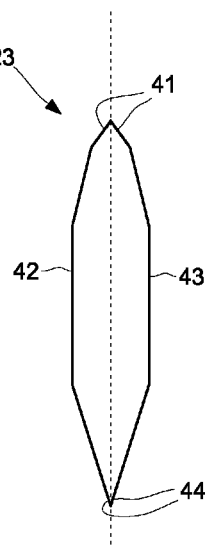 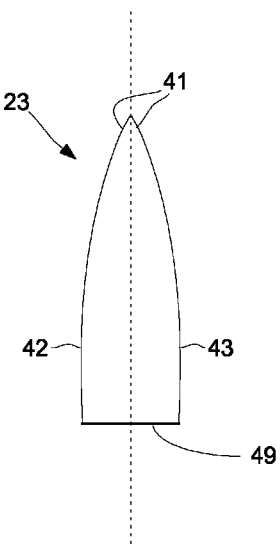
Fig. 12     Fig. 13     Fig. 14

DOUBLE SEAT VALVE

CROSS-REFERENCE TO RELATED APPLICATIONS

The invention is related to European Patent Application No. 13173317.2, filed on Jun. 21, 2013, which is incorporated herein by reference.

TECHNICAL FIELD

The invention relates to a double seat valve that has a first and a second closing element that can be moved into sealing abutment with a respective valve seat. The second closing element is connected to a displacement rod via spokes that extend radially outwards from the second displacement rod to the second closing element, such that interspaces are formed between the spokes for allowing fluid to flow from a leakage chamber and into a drain passage.

BACKGROUND ART

The so called double seat valve is a special type of valve with a valve housing that has first and second valve seats and first and second pipe sections, where the first valve seat may seal against the first pipe section and the second valve seat may seal against the second pipe section. A first closing element, or valve disk, is connected to a first displacement rod for moving the first closing element into sealing abutment with the first valve seat. A second closing element, or valve disk, is connected to a second displacement rod for moving the second closing element into sealing abutment with the second valve seat.

The closing elements and the displacements rods are coaxially arranged and the first displacement rod is typically hollow (tube shaped) such that the second displacement rod can move in an axial direction within the hollow space in the first displacement rod. The valve typically incorporates one or more actuator that effects movement of the displacement rods and thus movement of the closing elements.

The valve seats are coaxially arranged and the closing members face each other. A leakage chamber is arranged between the first and the second closing elements. When the valve is closed the leakage chamber is sealed towards the pipe sections of the valve housing. However, if the sealings are not tight, fluid may enter the leakage chamber from the pipe sections. Such leaked fluid then leaves the leakage chamber via a drain passage that leads fluid from the leakage chamber and to an outlet where the leaked fluid is collected.

For one type of double seat valves the second closing element is ring- or tube-shaped and is connected to the second displacement rod via spokes. The drain passage then extends from the second closing elements ring or tube and out through the valve hosing, such that fluid may pass from the leakage chamber, past the spokes trough interspaces between the spokes and to the drain passage.

The double seat valve has a number of positions for different operation states. For example, in a closed position both valve seats are sealed by the closing elements and no fluid may flow between the two pipe sections.

In an open position both closing elements are lifted from the valve seats such that fluid may flow between the pipe sections.

In a first cleaning position the first closing element is lifted a short distance from its valve seat (the first valve seat) and cleaning fluid that is passed through the first pipe section can then flow also past the first valve seat, into the leakage chamber and thereafter out through the drain passage. This accomplishes cleaning of the first pipe section, the first valve seat and the leakage chamber.

Often the valve has a second cleaning position in which the second closing element is lifted a short distance from its valve seat (the second valve seat). Cleaning fluid that is passed through the second pipe section then flows also past the second valve seat, into the leakage chamber and thereafter out through the drain passage, which effects cleaning of the second pipe section, the second valve seat and the leakage chamber. The cleaning in one or more cleaning positions is done for hygienic reasons and is normally done in an automatic manner at predetermined time intervals and for predetermined periods of time.

Cleaning may be referred to as seat lift of seat push, depending on what direction the closing element is moved when the cleaning is initiated.

Double seat valves of the type described above, including their actuators and the different operation states, are described in the prior art, such as in patent documents U.S. Pat. Nos. 6,047,730, 7,891,376, 8,336,572 and US2010/0051115. They are also commercially available and sold by e.g. Alfa Laval under the product group name "Mixproof Valve".

It is important that the cleaning is done as efficient as possible and that cleaning fluid in the leakage chamber is effectively led to the drain passage. All parts that has been in contact with any fluid must typically be cleaned, which includes e.g. the leakage chamber, closing elements, displacement rods, spokes, seats, drain passage, relevant gaskets etc.

Most prior art double seat valves are able to clean those parts that must be cleaned. However, there is still a need to improve cleaning, in particular for reducing the cleaning time as well as for reducing the amount of cleaning liquid required for obtaining proper cleaning. Also, during cleaning, there are sometimes problems with pressure build-up in the leakage chamber and/or with backsplash in form of liquid that hits the opposite closing element. It might even be desirable to secure that no positive pressure can occur on a sealing that is arranged on the closing element that is opposite to the closing element that is in a seat lift or a seat push mode.

SUMMARY

It is an object of the invention to at least partly overcome one or more of the above-identified limitations of the prior art. In particular, it is an object to provide a double seat valve that may be more efficiently cleaned while simultaneously reducing or even eliminating pressure build-up in the leakage chamber and/or backsplash to the opposite sealing.

To fulfill these objects a double seat valve is provided, which comprises a valve housing having a first valve seat and a second valve seat, a first closing element and a first displacement rod that is connected to the first closing element for moving the first closing element into sealing abutment with the first valve seat, a second closing element and a second displacement rod that is connected to the second closing element for moving the second closing element into sealing abutment with the second valve seat, and a leakage chamber arranged intermediate the first and second closing elements. The closing elements can be lifted independently of one another from their sealing abutment with the respective valve seat, and the second closing element is connected to the second displacement rod via spokes that extend radially outwards from the second displacement rod to the second closing element, such that interspaces are formed between the spokes for allowing fluid to flow from the leakage chamber and into a drain passage. At least one of the spokes comprises a leading edge that faces the leakage chamber and extends in a radial direction outwards from the second displacement rod, a first side that extends from the leading edge in a direction from the leakage chamber to the drain passage, and a second side that extends from the leading edge in the direction from the leakage chamber to the drain passage.

The leading edge may be compared with a leading edge of an airplane wing. Thus, the leading edge is the part of the spoke that first contacts the fluid, and/or is, as seen in a flow direction, the foremost edge or part of the spoke. The spoke is typically symmetrical and have thus properties that are similar to those of a symmetrical airplane wing.

The spoke with the leading edge provides several advantages. For example, it assists in reducing or even preventing a pressure-build up in the leakage chamber during cleaning. The leading edge may even assist in providing a vacuum, typically in cooperation with other, below described features of the spoke. The leading edge also assists in reflecting fluid in a direction away from the leakage chamber, i.e. in a direction towards the drain passage. As a result the double seat valve and in particular the leakage chamber, the second closing element and the drain passage are more efficiently cleaned while pressure build-up and backsplash may be avoided.

The spoke may comprise, as seen in the direction from the leakage chamber to the drain passage, a first cross-section and a second cross-section, wherein the second cross-section is wider than the first cross-section. These cross-sections are features that further emphasize the structure and the function of the leading edge.

The spoke may comprise a trailing edge. The trailing edge may be compared with a trailing edge of an airplane wing. Thus, the trailing edge is the part of the spoke that last contacts the fluid, and/or is, as seen in a flow direction, the lastmost edge or part of the spoke.

The spoke may comprise, as seen in the direction from the leakage chamber to the drain passage, the first cross-section, the second cross-section and a third cross-section, wherein the second cross-section is wider than the third cross-section. The third cross-section represents a feature that further emphasizes the structure and the function of the trailing edge.

The leading edge may comprise a sharp edge. The trailing edge may also comprise a sharp edge. The sharp edge on the leading edge is advantageous in that it directs the liquid towards the drain passage and reduces or even eliminates backsplash from the spoke. The sharp edge on the trailing edge is advantageous in that it reduces shadow areas where there is no or a reduced flow of cleaning fluid.

The first side and the second side may be continuously curved and may extend from the leading edge to the trailing edge, on a respective side of the spoke. This is advantageous since it reduces drag around the spoke and thus a pressure build-up in the leakage chamber.

The double seat valve may comprise a number of spokes that has trailing edges that meet in a trailing tip. The trailing tip typically shares the same advantages as the sharp edge at the trailing edge, i.e. it reduces shadow areas that are not subjected to or inadequately subjected to cleaning fluid.

In one embodiment the leading edge may extend along the full length of the spoke. In another embodiment the spoke may comprise an abutment member that is located adjacent the leading edge and arranged to abut the first closing element when the closing elements are lifted from the valve seats. The abutment member eliminates the need for the second closing member to abut the first closing member when the closing elements are lifted from the valve seats. This is in turn advantageous since it provides for a more free design of the second closing element.

The abutment member may be located between the leading edge and a peripheral edge of the second closing element, and the spoke may comprise a further leading edge that is located between the abutment member and the peripheral edge of the second closing element.

The second closing element may comprise the drain passage and wherein an inner surface of the second closing element and an inner surface of the drain passage together form either: a continuously curved surface that narrows in the direction from the leakage chamber to the drain passage; or a surface of two or more flat or curved surface segments that narrows in the direction from the leakage chamber to the drain passage. In another embodiment the second closing element may comprise the drain passage and an inner surface of the second closing element and an inner surface of the drain passage may together form a trumpet-shaped surface.

Such surfaces are advantageous in that they may provide a venturi-like effect that secures that there is no pressure build-up in the leakage chamber. The surfaces may even contribute to lowering the pressure in the leakage chamber by providing higher velocity of liquid that leaves the leakage chamber. They also provide for using relatively small dimensions for the drain passage, which it turns reduces the size of the valve housing.

The second closing element may comprise a peripheral edge and an inner surface that extends from the peripheral edge in the direction from the leakage chamber to the drain passage. This means that the second closing member does not have any flat, upper rim that faces the first closing member. This is advantageous since the pressure build-up in the leakage chamber may be reduced during cleaning.

L1 may be 2.8 to 3.4 times larger than L2, where L1 is the diameter of a peripheral surface of the second closing element and D2 is the inner diameter of the drain passage, and L1 may be 1.6 to 2 times larger than L3, where L3 is the axial distance between the diameters L1 and L2.

The features above all, either directly or indirectly, contributing to a double seat valve where pressure build-up and backsplash in the leakage chamber is prevented while efficient cleaning is still obtained. In brief, the shape of the inner surfaces of the second closing element and the drain passage provides for a waterfall effect that allows liquid to flow by as well as a venture-like effect that reduces pressure build-up in the leakage chamber. The leading edge and trailing edge each provides for an airwing-like design that reduces drag from the spoke and thus a pressure build-up in the leakage chamber. The sharp edge on the leading edge reduces backsplash while the sharp edge on the trailing edge and the trailing tip reduces shadow areas, i.e. areas that are difficult to clean. It is actually possible, by using one or more of the described features, to obtain a negative pressure in the leakage chamber during cleaning, which secures liquid exchange and thereby rinsing. Still the cleaning per se is efficiently accomplished.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIGS. 10 and 11 illustrates a cross-section of the spoke used in the valve of FIG. 1, and FIGS. 12-14 illustrate alternative embodiments of cross-sections for spokes that may be used for the valve of FIG. 1.

DETAILED DESCRIPTION

Figure 1:
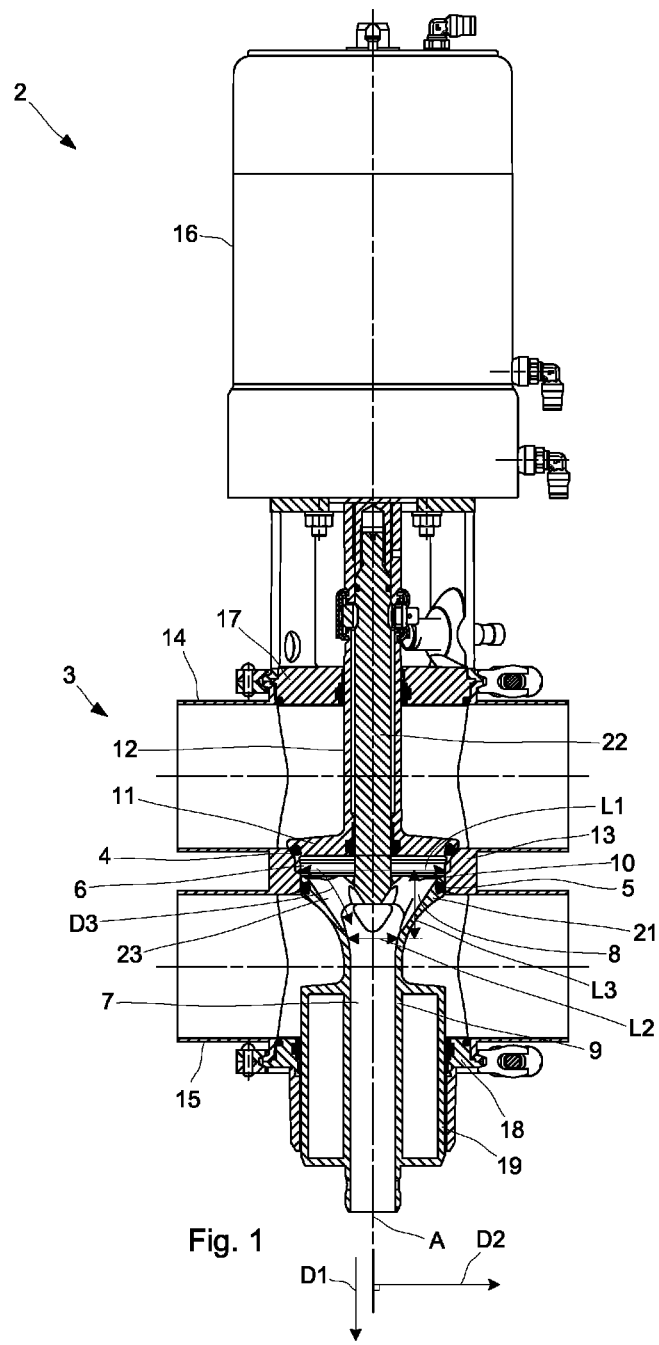
FIG. 1 is a cross-sectional view of double seat valve.

With reference to FIG. 1 a double seat valve 2 is illustrated. The double seat valve 2 has a valve housing 3 with a first pipe section 14 and a second pipe section 15. The pipe sections 14, 15 are joined to each other via an intermediate housing part 13. The intermediate housing part 13 forms a passage between the first pipe section 14 and the second pipe section 15. A first valve seat 4 is arranged at an end of the intermediate housing part 13 that is closest to the first pipe section 14 while a second valve seat 5 is arranged at an end of the intermediate housing part 13 that is closest to the second pipe section 15.

An actuator 16 is connected to the valve housing 3, on the first pipe section 14 at a position on the first pipe section 14 that is opposite the intermediate housing part 13. A first displacement rod 12 extends along a main axis A of the valve 2, from the valve housing 3, through an upper valve bonnet 17 and into the first pipe section 14. At an end of the first displacement rod 12 a first closing element 11 is arranged. The first closing element 11 has the form of a disk with a central through hole. The first displacement rod 12 has an axial through hole.

A second displacement rod 22 extends coaxially with the first displacement rod 12, from the actuator 16, through the axial hole in the first displacement rod 12, through the central hole in the first closing element 11 and through the intermediate housing part 13. At an end of the second displacement rod 22 a second closing element 21 is arranged. The second closing element 21 has the form of a ring or tube and is attached to the second displacement rod 22 via spokes 23 that extend radially outwards, from the second displacement rod 22 to the second closing element 21, thereby forming interspaces between the spokes 23 which allows fluid to flow past the spokes 23. In the shown embodiment four spokes 23-26 (see FIG. 6) attach the second closing element 21 to the second displacement rod 22 and four interspaces 27-30 are located between the spokes 23-26. The spokes 23-26 may be referred to as traverses or connection pieces. The spokes 23-26 are located at substantially the same axial distance from the actuator 16 as the second closing element 21.

The main axis A is the axis along which the first displacement rod 12 second displacement rod 22 extend. The first and second displacement rods 12, 22 are symmetrical about the main axis A and are movable, or displaceable, in a direction that is parallel to the main axis A.

A drain passage 7 extends from the second closing element 21, through the second pipe section 15, through a lower valve bonnet 18 and to the outside of the valve housing 3.

The first closing element 11 and the second closing element 21 face each other and a leakage chamber 6 is located intermediate the first and second closing elements 11, 21. The boundaries of the leakage chamber 6 are defined by the surface of the first closing element 11 that faces the second closing element 21, by the surface of the second closing element 21 that faces the first closing element 11 and by an inner, circular surface of the intermediate housing part 13. Fluid in the leakage chamber 6 may flow past the spokes 23, into the drain passage 7 and further out from the drain passage 7 through a drain opening.

The displacement rods 12, 22, the closing elements 11, 21, the seats 4, 5 and the drain passage 7 typically have circular shapes and are symmetrical about the main axis A. The drain passage 7 has a balance cylinder 19 at a position of the drain passage 7 where the drain passage 7 extends through the lower valve bonnet 18.

Figure 2:
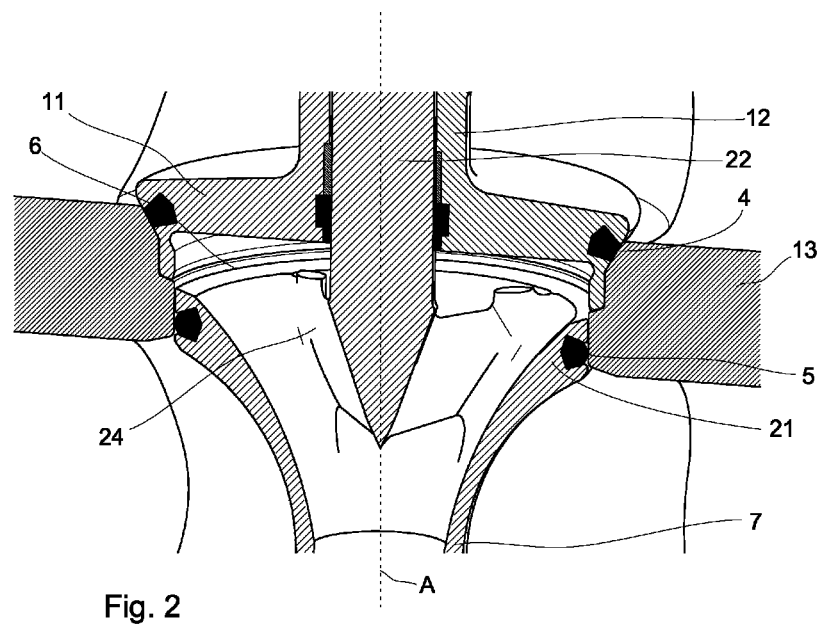
FIG. 2 is a cross-sectional, partial perspective view of the valve of FIG. 1 when the valve is in a closed position.

The double seat valve 2 is in FIG. 1 in its closed position. The closed position is illustrated in larger detail by FIG. 2, where the first closing element 11 sealingly abuts the first valve seat 4 and where the second closing element 21 sealingly abuts the second valve seat 5. Each of the closing elements 11, 21 has a respective annular groove for a gasket that assists in obtaining a proper seal against the respective valve seat 4, 5. The closing elements 11, 21 are held in their respective position by the actuator 16. In the closed position no fluid may flow between the first pipe section 14 and the second pipe section 15. If some fluid would leak past the valve seats 4, 5 the leaked fluid would then enter the leakage chamber 6 and leave the leakage chamber 6 by flowing past the spokes 23 and into the drain passage 7.

Figure 3:
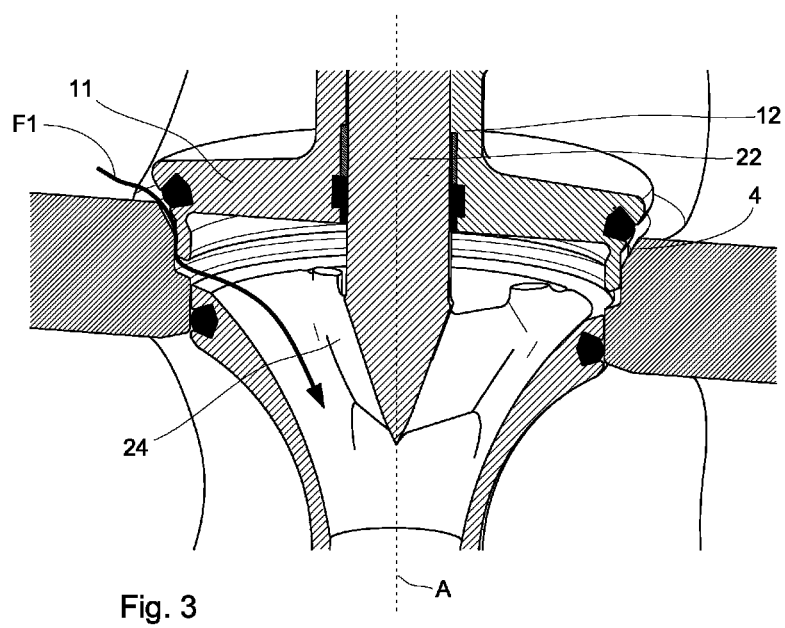
FIG. 3 is a cross-sectional, partial perspective view of the valve of FIG. 1 when the valve is in a first cleaning position, or seat lift position.

With further reference to FIG. 3 the double seat valve 2 is set in a first cleaning position or performs a so called upper seat lift. In this position the actuator 16 lifts the first closing element 11 a short distance from the first valve seat 4, such that there is a small passage between the first closing element 11 and the first valve seat 4. The second closing element 21 abuts the second valve seat 5. This allows cleaning fluid that flows in the first pipe section 14 to enter the leakage chamber 6 via the passage, which effectively cleans a periphery of the first closing element 11 including any gaskets on the first closing element 11, cleans the first valve seat 4 and cleans the leakage chamber 6 as well as the drain passage 7. Fluid that accomplishes this cleaning basically follows a first flow path F1.

Figure 4:
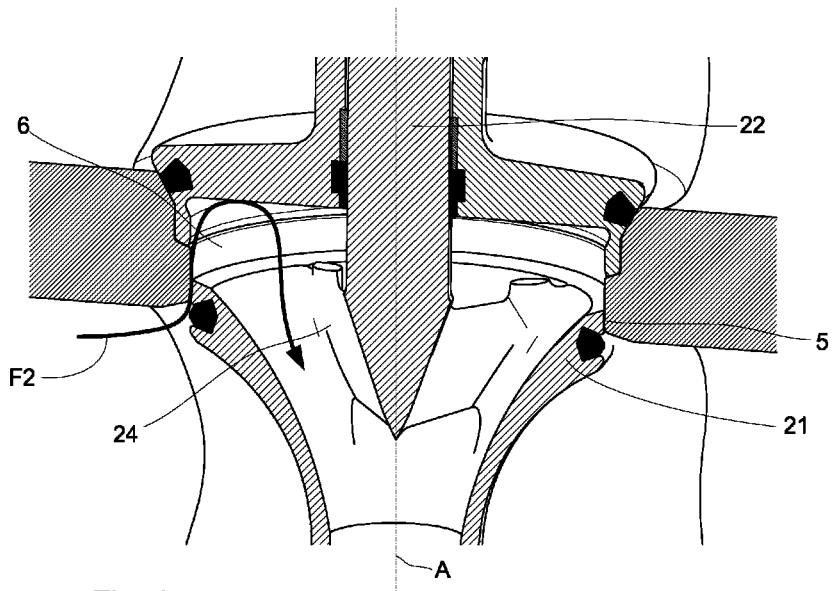
FIG. 4 is a cross-sectional, partial perspective view of the valve of FIG. 1 when the valve is in a second cleaning position, or seat push position.

With further reference to FIG. 4 the double seat valve 2 is set in a second cleaning position or performs a so called seat push. In this position the actuator 16 pushes second closing element 21 a short distance from the first valve seat 4, such that there is a small passage between the second closing element 21 and the second valve seat 5. The first closing element 11 abuts the first valve seat 4. This allows cleaning fluid that flows in the second pipe section 15 to enter the leakage chamber 6 via the passage, which effectively cleans a periphery of the second closing element 21 including any gaskets on the second closing element 21, cleans the second valve seat 5 and cleans the leakage chamber 6 as well as the drain passage 7. Fluid that accomplishes this cleaning basically follows a second flow path F2.

The double seat valve 2 may also be set in an open position (not illustrated). In this position the actuator 16 lifts both the first closing element 11 and the second closing element 21 in a direction towards the actuator 16, such that fluid may flow between the first pipe section 14 and the second pipe section 15.

How to set the double seat valve 2 in the above described positions is well known from the prior art and the actuator 16 may be implemented according to known techniques and methods.

Figure 5:
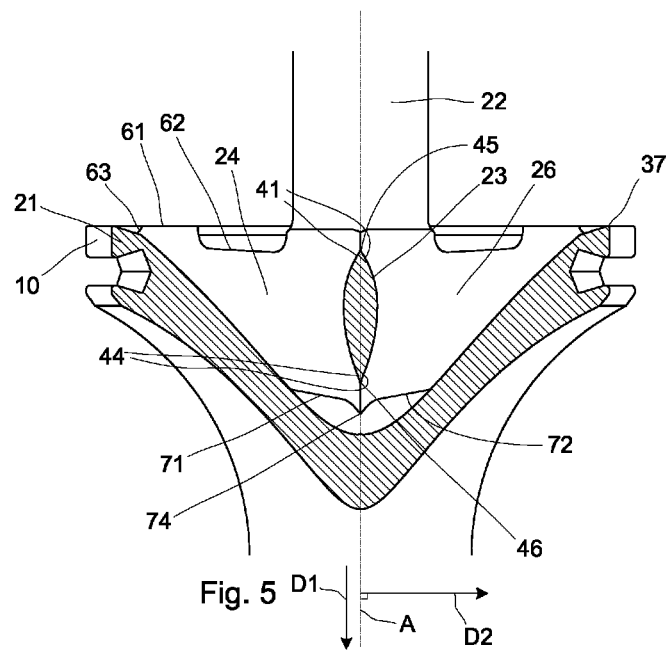
FIG. 5 is a cross-sectional, partial view of a closing member, displacement rod and spokes that are used for the valve of FIG. 1.
Figure 6:
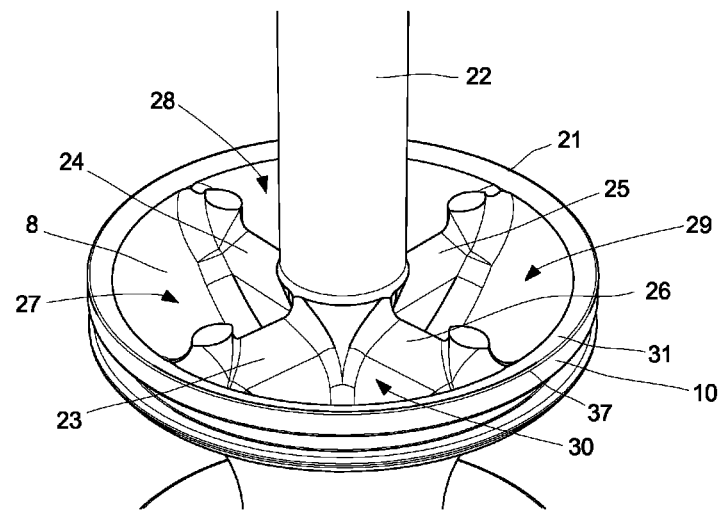
FIG. 6 is a partial perspective view of the closing member, displacement rod and spokes of FIG. 5.

With further reference to FIGS. 5 and 6 the spokes 23-26 are similar and are symmetrically arranged around the second displacement rod 22. Using a first spoke 23 of the spokes 23-26 as an illustrating example, the spoke 23 has a leading edge 41 that faces the leakage chamber 6 and extends in a radial direction outwards from the second displacement rod 22. The radial direction is indicated by direction D2. The spoke 23 also extends in an axial direction D1, i.e. the spoke 23 has an axial extension. The axial direction D1 may also be seen as being a direction from the leakage chamber 6 to the drain passage 7. A direction from the leakage chamber 6 to the drain passage 7 is also indicated by D3.

That the spoke 23 extends in a radial direction means that it has a radial extension. It must not necessarily extend in a direction that is parallel to a radial direction, since it may be slanted either upwards against the second displacement rod 22 or slanted in the other direction (downwards against the second displacement rod 22).

With further reference to FIG. 10, which shows a cross section of the spoke 23, the spoke 23 has a trailing edge 44. A first side 42 of the spoke 23 extends from the leading edge 41 in the direction D3 from the leakage chamber 6 to the drain passage 7. A second side 43 of the spoke 23 also extends from the leading edge 41 in the direction from the leakage chamber 6 to the drain passage 7. The sides 42, 43 of the spoke 23 may also be said to extend from the leading edge 41 and in the axial direction D1.

The trailing edge 44 is opposite the leading edge 41. The sides 42, 43 extend from the leading edge 41 to the trailing edge 44. The leading edge 41 has at an uppermost location a sharp edge 45 and the trailing edge 44 has at a downmost position a sharp edge 46. For the illustrated double seat valve 2, "uppermost" and "upper" indicate that an object is located closer to the actuator 16 than an object that is referred to as "downmost" or as "lower". "Outmost" and "outer" indicate that an object is located further from the center axis A than on object that is referred to as "innermost" or as "inner". Uppermost may mean closest to the actuator, downmost may mean most distant from the actuator, innermost may mean closest to the center axis A and outmost may mean most distant from the center axis A.

The first side 42 has a curved surface 42' and the second side 43 has a curved surface 43'. The first side 42 and the second side 43 are continuously curved and extend from the leading edge 41 to the trailing edge 44, on a respective side of the spoke 23. The curved surface 42' of the first side 42 has a curvature that comprises a number of tangents, such as three (3), ten (10) or even more tangents, that are inclined by a respective angle towards the main axis A. Two such tangents are illustrated; tangent t1 that is inclined by angle a1 and tangent t2 that is inclined by angle a2. The curved surface 43' of the second side 43 also has a curvature that comprises a number of tangents, such as three (3), ten (10) or even more tangents, that are inclined by a respective angle towards the main axis A.

In this context, a "tangent" refers to a conventional tangent as defined by and used in common geometry. A "curved surface", such as the curved surfaces indicated by reference numerals 42' and 43', may refer to a non-straight or non-plane surface.

With further reference to FIG. 11, the spoke 23 has, as seen in the direction D1, D3 from the leakage chamber 6 to the drain passage 7 and in said order, a first cross-section 55, a second cross-section 56 and a third cross-section 57, where the second cross-section 56 is wider than both the first cross-section 55 and the third cross-section 57. The cross-sections 55, 56 and 57 may each be referred to as a respective width or thickness of the spoke 23. The cross-sections 55, 56, 57 are seen in direction that is parallel with a direction from the second displacement rod 22 to the second closing element 21, i.e. along the spokes 23 extension from the second displacement rod 22 to the second closing element 21.

As may be seen form the figures, the first side 42 and the second side 43 are each continuously curved and extend from the leading edge 41 to the trailing edge 44, on a respective side of the spoke 23. The leading edge 41 may be seen as a part or a section 51 of the spoke 23 that first contacts the fluid, and/or is, as seen in a flow direction from the leakage chamber 6 to the drain passage 7, the foremost edge or part of the spoke 23. The trailing edge 44 may be seen as a part or section 54 of the spoke 23 that last contacts the fluid, and/or is, as seen in a flow direction from the leakage chamber 6 to the drain passage 7, the lastmost edge or part of the spoke 23. Between the leading edge 41 and the trailing edge 44 the spoke 23 has a midsection 53 that forms the thickest section of the spoke 23.

Turning back to FIG. 5 the double seat valve 2 has four spokes 23-26. The spokes are symmetrically arranged and are in the illustrated embodiment identical. Each of the spokes 23-26 has a respective trailing edge 46, 71, 72 and the trailing edges 46, 71, 72 extend from the second closing element 21 to the central axis A where they meet in a trailing tip 74.

The leading edge 41 may extend along the full length of the spoke 23, from the second closing element 21 to the second displacement rod 22. However and with further reference to FIG. 7, the spoke, here exemplified by spoke 24, may comprise an abutment member 61 that is located adjacent the leading edge 62 and arranged to abut the first closing element 11 when the closing elements 11, 21 are lifted from the valve seats 4, 5, i.e. when the valve 2 is in the open position. This abutment is implemented for allowing the second closing element 21 to assist in lifting of the first closing element 11. Traditionally, an upper, radially flat and circular rim of the second closing element 21 was used for assisting in lifting the first closing element 11 when opening the valve.

The spoke 24 has a further leading edge 63 that is located between the abutment member 61 and a peripheral edge 37 of the second closing element 21. The abutment member 61 is located between the leading edge 62 and the peripheral edge 37 of the second closing element 21.

Figure 7:
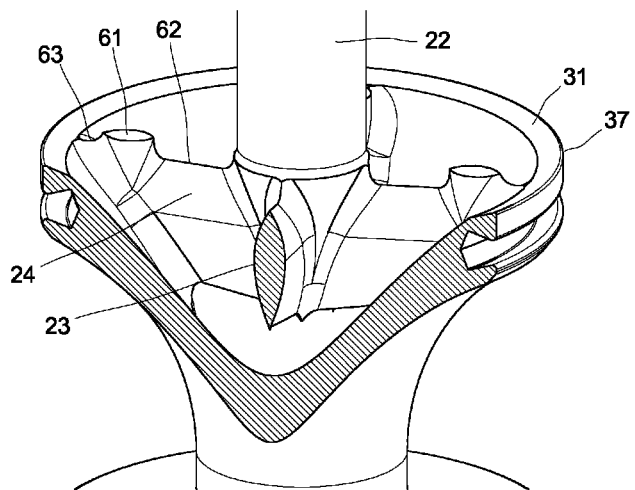
FIG. 7 is a cross-sectional, partial perspective view of the closing member, displacement rod and spokes of FIG. 5.

As may be seen on e.g. FIGS. 6 and 7, the peripheral edge 37 of the second closing element 21 is, as seen in a radial direction of the second closing element 21, an outermost and uppermost edge of the second closing element 21. Of all outer surfaces of the second closing element 21 a peripheral surface 10 is the most upper one and terminates at an uppermost edge 37. An inner surface 31 of the second closing element 21 extends from the edge 37 in the direction D1, D3 from the leakage chamber 6 to the drain passage 7. This means that there is no flat surface that extends from the peripheral edge 37 in a direction that is parallel to a radial direction of the second closing element 21. Instead it may be said that the second closing element 21 has an, upper, peripheral sharp edge. An angle between the peripheral surface 10 and the inner surface 31 that extends from the peripheral edge 37 is smaller than 90°.

Turning back to FIG. 1, it may be said the second closing element 21 comprises the drain passage 7. An inner surface 8 of the second closing element 21 and an inner surface 9 of the drain passage 7 together form a continuously curved surface 8, 9 that narrows in the direction D1, D3 from the leakage chamber 6 to the drain passage 7. It may be said that the inner surfaces 8, 9 together form a trumpet-shaped surface 8, 9. Alternatively, the inner surfaces 8, 9 may have one or more flat or curved surface segments that narrow in the direction D1, D3 from the leakage chamber 6 to the drain passage 7.

The second closing element 21 and the drain passage 7 may be given some predetermined measurements. For example, L1 may be 2.8 to 3.4 times larger than L2, where L1 is the diameter of the peripheral surface 10 of the second closing element 21 and L2 is an inner diameter of the drain passage 7. L1 may be 1.6 to 2 times larger than L3, where L3 is the axial distance between the diameters L1 and L2. With reference to FIG. 12 the spoke 23 a leading edge 41 and/or trailing edge 44 that is rounded. This gives the spoke 23 a cross-sectional shape that is identical with a symmetrical airplane wing.

With reference to FIG. 13 the sides 42, 43 of the spoke 23 may have straight surfaces segments that extend from the leading edge 41 to the trailing edge 44. At least two straight surfaces segments are required.

With reference to FIG. 14 the spoke 23 may be embodied without a trailing edge. In this case the spoke 23 has a flat surface 49 that connects the sides 42, 43. The various embodiments of leading edges, trailing edges and sides shown in FIGS. 10 and 12-14 may be combined to form new embodiments of spokes.

The leading edge 41 may be defined as a part of the spoke 23 that forms an edge part that has a smaller width or cross-section than a section of the spoke 23 that is, as seen in the direction D1, D3, located after the leading edge 41. The trailing edge 44 may be defined as a part of the spoke 23 that forms an edge part that has a smaller width or cross-section than a section of the spoke 23 that is, as seen in the direction D1, D3, located before the leading edge 41.

Figure 8:
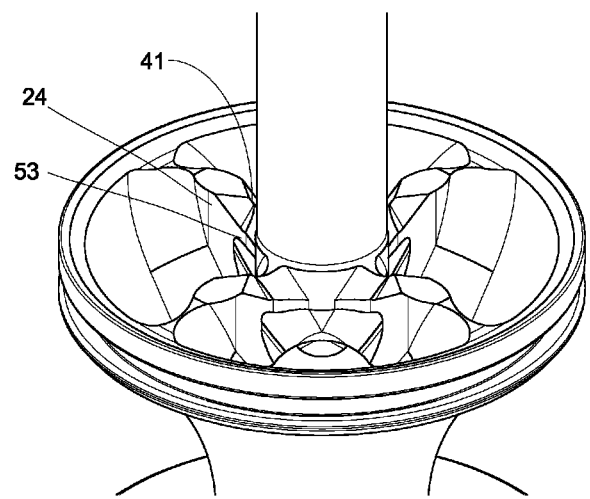
FIG. 8 is a partial perspective view of another embodiment of a closing member, displacement rod and spokes that may be used for the valve of FIG. 1.
Figure 9:
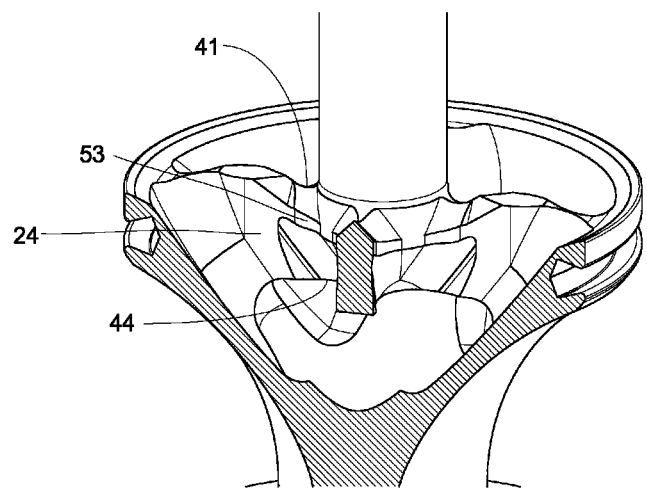
FIG. 9 is a cross-sectional, partial perspective view of the closing member, displacement rod and spokes of FIG. 8.

With reference to FIGS. 8 and 9 another embodiment of the spokes is illustrated. Each spoke, such as spoke 24, has a leading edge 41, a trailing edge 44 and a midsection 53 that is located intermediate the leading edge 41 and the trailing edge 44 and that is wider than both the leading edge 41 and the trailing edge 44. The leading edge 41 has a very small, flat edge.

From the description above follows that, although various embodiments of the invention have been described and shown, the invention is not restricted thereto, but may also be embodied in other ways within the scope of the subject-matter defined in the following claims.

The invention claimed is:
1. A double seat valve comprising
a valve housing having a first valve seat and a second valve seat,
a first closing element and a first displacement rod that is connected to the first closing element for moving the first closing element into sealing abutment with the first valve seat,
a second closing element and a second displacement rod that is connected to the second closing element for moving the second closing element into sealing abutment with the second valve seat, and
a leakage chamber arranged intermediate the first and second closing elements,
wherein the closing elements can be lifted independently of one another from their sealing abutment with the respective valve seat, and
the second closing element is connected to the second displacement rod via spokes that extend radially outwards from the second displacement rod to the second closing element, such that interspaces are formed between the spokes for allowing fluid to flow from the leakage chamber and into a drain passage, wherein at least one of the spokes comprises
a leading edge that faces the leakage chamber and extends in a radial direction outwards from the second displacement rod,
a first side that extends from the leading edge in a direction from the leakage chamber to the drain passage,
a second side that extends from the leading edge in the direction from the leakage chamber to the drain passage, and
a cross-section that varies in a direction from the leakage chamber to the drain passage so that the at least one spoke possesses a first cross-section, a second cross-section spaced from the first cross-section, and a third cross-section spaced from the second cross-section, the second cross-section being positioned between the first and third cross-sections with respect to the direction from the leakage chamber to the drain passage, the second cross-section being wider than both the first cross-section and the third cross-section.

2. A double seat valve according to claim 1, wherein the leading edge comprises a sharp edge.

3. A double seat valve according to claim 1, wherein at least one spoke comprises a trailing edge.

4. A double seat valve according to claim 3, wherein the first side and the second side comprises a respectively curved surface.

5. A double seat valve according to claim 3, wherein the trailing edge comprises a sharp edge.

6. A double seat valve according to claim 1, wherein the at least one spoke includes all of the spokes that connect the second closing element to the second displacement rod, the spokes each possessing trailing edges that meet in a trailing tip.

7. A double seat valve according to claim 1, wherein the leading edge extends along the full length of the at least one spoke.

8. A double seat valve according to claim 1, wherein the at least one spoke comprises an abutment member that is located adjacent the leading edge and arranged to abut the first closing element when the closing elements are lifted from the valve seats.

9. A double seat valve according to claim 8, wherein the abutment member is located between the leading edge and a peripheral edge of the second closing element, the at least one spoke comprising a further leading edge that is located between the abutment member and the peripheral edge of the second closing element.

10. A double seat valve according to claim 1, wherein the second closing element comprises the drain passage and wherein an inner surface of the second closing element and an inner surface of the drain passage together form either
   a continuously curved surface that narrows in the direction from the leakage chamber to the drain passage, or
   a surface of two or more flat or curved surface segments that narrows in the direction from the leakage chamber to the drain passage.

11. A double seat valve according to claim 1, wherein the second closing element comprises the drain passage and wherein an inner surface of the second closing element and an inner surface of the drain passage together form a trumpet-shaped surface.

12. A double seat valve according to claim 1, wherein the second closing element comprises a peripheral edge and an inner surface that extends from the peripheral edge, in the direction from the leakage chamber to the drain passage.

13. A double seat valve according to claim 1, wherein
   L1 is 2.8 to 3.4 times larger than L2, where L1 is the diameter of a peripheral surface of the second closing element and L2 is an inner diameter of the drain passage, and
   L1 is 1.6 to 2 times larger than L3, where L3 is the axial distance between the diameters L1 and L2.

14. A double seat valve comprising
   a valve housing having a first valve seat and a second valve seat,
   a first closing element and a first displacement rod that is connected to the first closing element for moving the first closing element into sealing abutment with the first valve seat,
   a second closing element and a second displacement rod that is connected to the second closing element for moving the second closing element into sealing abutment with the second valve seat,
   a leakage chamber arranged intermediate the first and second closing elements,
   the closing elements being configured to be lifted independently of one another from their sealing abutment with the respective valve seat,
   the second closing element being connected to the second displacement rod via spokes that extend radially outwards from the second displacement rod to the second closing element, such that interspaces are formed between the spokes for allowing fluid to flow from the leakage chamber and into a drain passage, wherein at least one of the spokes comprises,
   a leading edge that faces the leakage chamber and extends in a radial direction outwards from the second displacement rod,
   a first side that extends from the leading edge in a direction from the leakage chamber to the drain passage,
   a second side that extends from the leading edge in the direction from the leakage chamber to the drain passage,
   the at least one spoke comprising an abutment member that is located adjacent the leading edge and arranged to abut the first closing element when the closing elements are lifted from the valve seats, and
   the abutment member being located between the leading edge and a peripheral edge of the second closing element, the at least one spoke comprising a further leading edge that is located between the abutment member and the peripheral edge of the second closing element.

15. A double seat valve according to claim 14, wherein the at least one spoke possesses a cross-section that varies in a direction from the leakage chamber to the drain passage so that the at least one spoke possesses a first cross-section, a second cross-section spaced from the first cross-section, and a third cross-section spaced from the second cross-section, the second cross-section being positioned between the first and third cross-sections with respect to the direction from the leakage chamber to the drain passage, the second cross-section being wider than both the first cross-section and the third cross-section.

16. A double seat valve according to claim 14, wherein the leading edge comprises a sharp edge.

17. A double seat valve according to claim 14, wherein the at least one spoke comprises a trailing edge that is a sharp edge, and the leading edge comprising a sharp edge.

* * * * *